United States Patent
Bober et al.

(10) Patent No.: US 6,938,039 B1
(45) Date of Patent: Aug. 30, 2005

(54) CONCURRENT FILE ACROSS AT A TARGET FILE SERVER DURING MIGRATION OF FILE SYSTEMS BETWEEN FILE SERVERS USING A NETWORK FILE SYSTEM ACCESS PROTOCOL

(75) Inventors: Paul M. Bober, Lexington, MA (US); Uresh Vahalia, Waban, MA (US); Aju John, Northborough, MA (US); Jeffrey L. Alexander, Watertown, MA (US); Uday K. Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1050 days.

(21) Appl. No.: 09/608,469

(22) Filed: Jun. 30, 2000

(51) Int. Cl.[7] ............................................... G06F 17/30
(52) U.S. Cl. ........................................ 707/8; 707/201
(58) Field of Search ............................... 707/1–10, 103, 707/200–206; 711/2, 4, 168; 714/5; 395/704

(56) References Cited

U.S. PATENT DOCUMENTS

| | | | |
|---|---|---|---|
| 4,686,620 A | 8/1987 | Ng | 364/200 |
| 4,755,928 A | 7/1988 | Johnson et al. | 364/200 |
| 4,993,030 A | 2/1991 | Krakauer et al. | 371/40.1 |

(Continued)

OTHER PUBLICATIONS

Paul J. Leach and Dilip C. Naik, Internet draft filename "*draft–leach–cifs–v1–spec–01.txt,*" *A Common Internet File System (CIFS/1.0) Protocol*, Network Working Group, Dec. 19, 1997, pp. 1–121.

Uresh Vahalia, *Unix Internals: The new frontiers, Chapter 9*, "File System Implementations," Prentice–Hall, Inc., Upper Saddle River, New Jersey, 1996, pp. 261–289.

D.L. Burkes and R.K. Treiber, "Design Approaches for Real–Time Transaction Processing Remote Site Recovery," Digest of Papers in Spring COMPCON90, Feb. 26–Mar. 2, 1990, *Thirty–Fifth IEEE Computer Society International Conference*, San Francisco, CA, pp. 568–572.

Sun Microsystems, Inc. "NFS: Network File System Protocol Specification," Network Working Group, http://www.attrition.org/~modify/texts/rfc/rfc1094.txt, Mar. 1989, 23 pages.

Peter Norton and Richard Wilton, "Chapter 5 Disk Basics," *The New Peter Norton Programmer's Guide to the IBM PC & PS/2*, Microsoft Press, Redmond, Washington, 1988, pp. 99–123.

(Continued)

*Primary Examiner*—Frantz Coby
*Assistant Examiner*—Marcin Filipczyk
(74) *Attorney, Agent, or Firm*—Richard C. Auchterlonic; Novak Druce & Quigg, LLP

(57) ABSTRACT

A file system is migrated from a source file server to a target file server in a data network while permitting clients to have concurrent read/write access to the file system. The target file server issues directory read requests and file read requests to the source file server in accordance with a network file access protocol to transfer the file system from the source file server to the target file server. Concurrent with the transfer of the file system from the source file server to the target file server, the target file server responds to client read/write requests for access to the file system. In a preferred embodiment, the target file server maintains a hierarchy of on-line nodes off-line nodes. The online nodes represent file system objects that have been completely migrated, and the offline nodes representing file system objects that have not been completely migrated. The target file server executes a background process that walks through the hierarchy in order to migrate the objects of the offline nodes. When an object has been completely migrated, the target file server changes the offline node for the object to an online node for the object.

65 Claims, 9 Drawing Sheets

U.S. PATENT DOCUMENTS

| | | | |
|---|---|---|---|
| 5,060,185 A | 10/1991 | Naito et al. | 364/900 |
| 5,155,845 A | 10/1992 | Beal et al. | 395/575 |
| 5,175,837 A | 12/1992 | Arnold et al. | 395/425 |
| 5,175,852 A | 12/1992 | Johnson et al. | 395/600 |
| 5,218,695 A | 6/1993 | Noveck et al. | 395/600 |
| 5,255,270 A | 10/1993 | Yanai et al. | 371/10.2 |
| 5,276,860 A | 1/1994 | Fortier et al. | 395/575 |
| 5,276,867 A | 1/1994 | Kenley et al. | 395/600 |
| 5,301,286 A | 4/1994 | Rajani | 395/400 |
| 5,341,493 A | 8/1994 | Yanai et al. | 35/42 |
| 5,367,698 A | 11/1994 | Webber et al. | 395/800 |
| 5,487,160 A | 1/1996 | Bemis | 395/441 |
| 5,535,381 A | 7/1996 | Kopper | 395/600 |
| 5,590,320 A | 12/1996 | Maxey | 395/619 |
| 5,594,863 A | 1/1997 | Stiles | 395/182.13 |
| 5,611,069 A | 3/1997 | Matoba | 395/441 |
| 5,673,382 A | 9/1997 | Cannon et al. | 395/182.04 |
| 5,701,516 A | 12/1997 | Cheng et al. | 395/842 |
| 5,742,792 A | 4/1998 | Yanai et al. | 395/489 |
| 5,829,046 A | 10/1998 | Tzelnic et al. | 711/162 |
| 5,829,047 A | 10/1998 | Jacks et al. | 711/162 |
| 5,835,953 A | 11/1998 | Ohran | 711/162 |
| 5,835,954 A | 11/1998 | Duyanovich et al. | 711/162 |
| 5,852,715 A | 12/1998 | Raz et al. | 395/200.31 |
| 5,857,208 A | 1/1999 | Ofek | 707/204 |
| 5,875,478 A | 2/1999 | Blumenau | 711/162 |
| 5,893,140 A | 4/1999 | Vahalia et al. | 711/118 |
| 5,901,327 A | 5/1999 | Ofek | 395/825 |
| 5,923,878 A * | 7/1999 | Marsland | 395/704 |
| 5,974,563 A * | 10/1999 | Beeler, Jr. | 714/5 |
| 5,978,951 A | 11/1999 | Lawler et al. | 714/758 |
| 6,076,148 A | 6/2000 | Kedem | 711/162 |
| 6,078,929 A * | 6/2000 | Rao | 707/200 |
| 6,081,875 A | 6/2000 | Clifton et al. | 711/162 |

OTHER PUBLICATIONS

"Filesystem *Manager*—VxFS" http://www.fujitsu-computers.com/Servers/software/ds-mgw-12.html, published at least as early as Oct. 28, 2000, 2 pages.

"Veritas Volume Manager" http://www.sun.com/stor.../volumemgr.html:$sessionid$QEOQTDQAAC2QHAMTA1FU5Y, published at least as early as Oct. 28, 2000, 3 pages.

"Veritas NetBackup and Storage Migrator" http://www.sun.com/stora.../netbackup.html;$sessionid$QEOQTDQAAC2QHAMTA1FU5Y, published at least as early as Oct. 28, 2000, 5 pages.

"Veritas File System, System Administrator's Guide," Release 3.2, Veritas Software Corporation, Introduction, Index, Performance and Tuning (Chapter 5), fsadm_vxfs(1M)—resize or reorganize a Veritas File System (http://uw7doc.sco.com/ODM_FSadmin/fssag-1.html, fssag-13.html, fssag-8.html, and http://uw7doc.sco.com/cgi-bin/man/man?fsadm_vxfs+1M) published; at least as early as Oct. 28, 00, 31 pages total.

"Network Data Management Protocol (NDMP)," http://www.ndmp.org/info/; NDMP White Paper, http://www.ndmp.org/info/technology/wp.html; "Protocol Specification Summary, Document Version: 1.7.2S," http://www.ndmp.org/info/spec_summary.html; "Legato Systems Embraces the NDMP Standard: Legato Networker Software to be NDMP Compliant in Q3," http://www-ftp.legata.com/News/Press/PR209.html; published at least as early as Oct. 11, 1999, 17 pages.

R. Stager and D. Hitz, Internet Draft filename "draft-stager-netapp-backup-0.5.txt" *Network Data Managment Protocol* (*NDMP*), last update Oct. 12, 1999, pp. 1–73.

Steere et al., "Efficient User-Level File Cache Management on the Sun Vnode Interface," USENIX Summer Conference, Jun. 11–15, 1990, Anaheim, California, pp. 325–331.

* cited by examiner

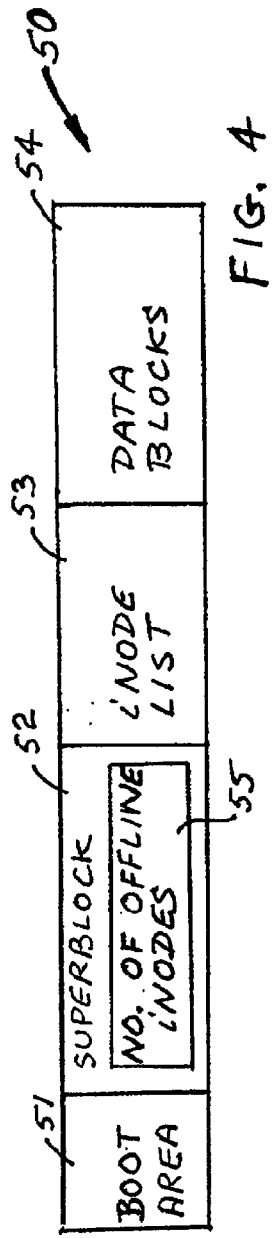
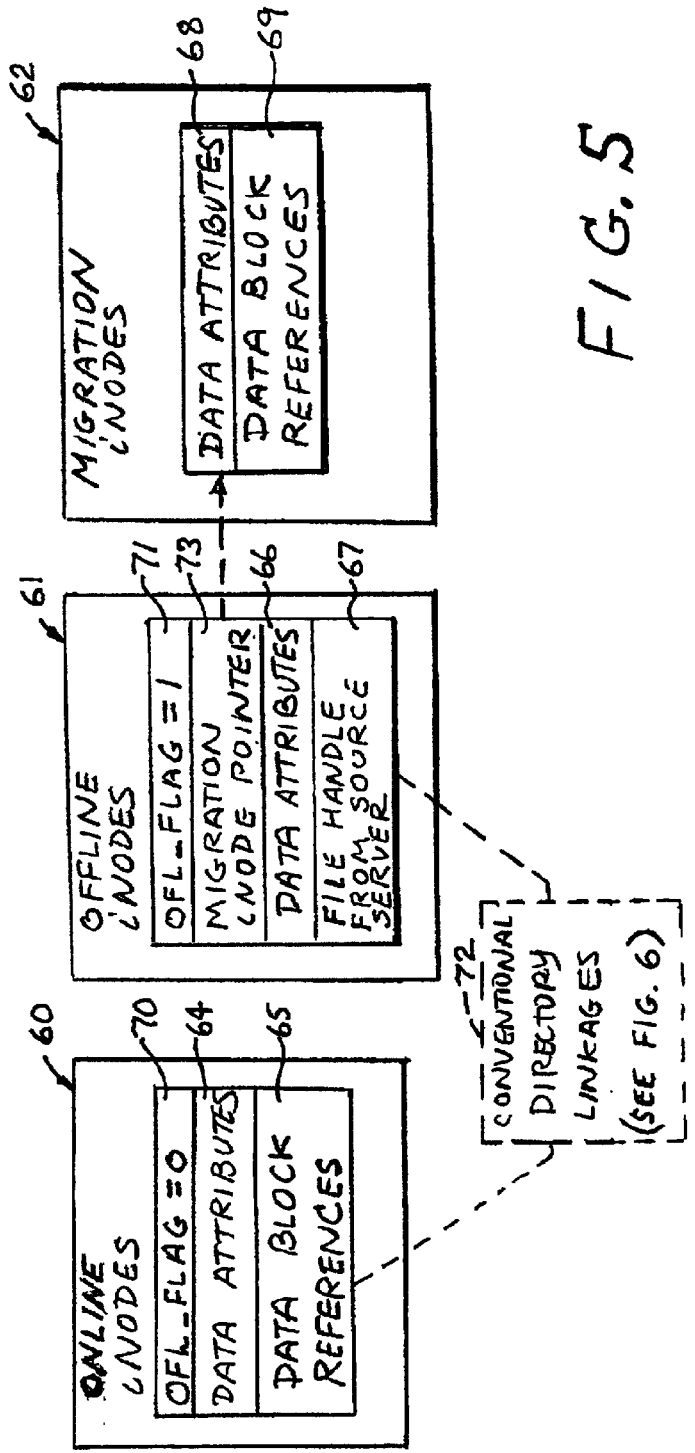

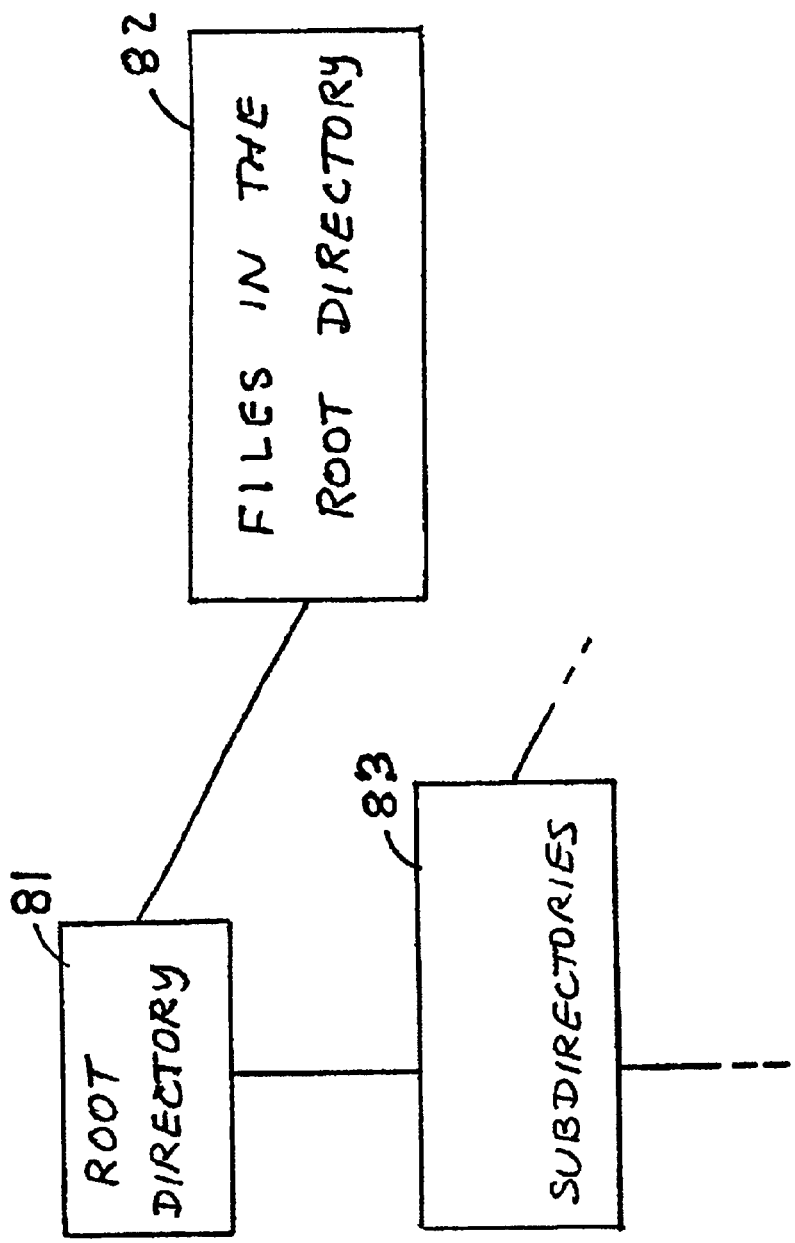

US 6,938,039 B1

CONCURRENT FILE ACROSS AT A TARGET FILE SERVER DURING MIGRATION OF FILE SYSTEMS BETWEEN FILE SERVERS USING A NETWORK FILE SYSTEM ACCESS PROTOCOL

BACKGROUND OF THE INVENTION

1. Limited Copyright Waiver

A portion of the disclosure of this patent document contains computer code listings to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

2. Field of the Invention

The present invention relates generally to file servers, and more particularly to migration of file systems between file servers.

3. Background Art

Network applications have required increasingly large amounts of data storage. Network data storage has been provided by a file server having at least one processor coupled to one or more disk drives. The file server executes a file system program that maps file names and block offsets in the files to physical addresses of data blocks on the disk drives. Typically the file system program maintains a UNIX-based file system having a hierarchical file system structure including directories and files, and each directory and file has an "inode" containing metadata of the directory or file. Popular UNIX-based file systems are the UNIX file system (ufs), which is a version of Berkeley Fast File System (FFS) integrated with a vnode/vfs structure, and the System V file system (s5fs). The implementation of the ufs and s5fs file systems is described in Chapter 9, pp. 261–289, of Uresh Vahalia, Unix Internals: The New Frontiers, 1996, Prentice Hall, Inc., Simon & Schuster, Upper Valley River, N.J. 07458.

Network clients typically use a network file system access protocol to access one or more file systems maintained by the file server. Popular network file system access protocols are the Network File, System (NFS) and the Common Internet File System (CIFS). NFS is described in "NFS: Network File Systems Protocol Specification," RFC 1094, Sun Microsystems, Inc., Mar. 1, 1989. The CIFS protocol is described, for example, in Paul L. Leach and Dilip C. Naik, "A Common Internet File System," Microsoft Corporation, Dec. 19, 1997.

During maintenance of a data processing network, it is often necessary or desirable to migrate file systems from one file server (the "source" file server) to another file server (the "target" file server). For example, files are typically migrated from an obsolete file server when the obsolete file server is to be removed from the data processing network. When a new file server is added to a network for increased storage capacity, file systems are typically migrated to the new file server from other file servers in order to balance loading among the file servers in the network. Migration is also used to move file systems between file servers in a network in order to consolidate related file systems in one particular file server for improved management of the related files.

The migration of file systems from a source file server to a target file server has been done in various ways. In general, it is not possible to simply copy the contents of the physical disks from the source file server to the target file server. The physical disk configuration of two file servers is very often different, and for this reason the file system performs a mapping of files to logical disk blocks instead of physical disk blocks. A lower layer in each file server maps the logical disk blocks to physical disk blocks in accordance with the particular physical disk drive configuration of each file server. It is sometimes possible to simply copy the contents of the logical disks from the source file server to the target file server, but most often each file server will have a different version or kind of file system program that would require a change in the precise organization of data on the logical drives of the target file server.

Typically migration is performed by the source file server converting the file system to a sequential format such as a tape format, the source file server transmitting the sequentially-formatted file system to the target file server, and the target file server converting the file system to the logical disk format required by the version and kind of file system program in the target file server. In a UNIX-based file system, the source file system may use a "tar" command to put the file system in a sequential tape format, and the target file server may use an "untar" command to convert the sequential tape format of the file system to the required logical disk format. Such a method of migration, however, does not permit the file system data to be updated during the time required for formatting, transmitting, and unformatting the file system.

SUMMARY OF THE INVENTION

In accordance with a basic aspect of the invention, there is provided a method of migrating a file system from a source file server to a target file server in a data network while permitting clients to have concurrent read/write access to the file system. The method includes the target file server issuing directory read requests and file read requests to the source file server in accordance with a network file access protocol to transfer the file system from the source file server to the target file server. The method also includes, concurrent with the transfer of the file system from the source file server to the target file server, the target file server responding to client read/write requests for access to the file system.

In accordance with another aspect of the invention, there is provided a method of migrating a file system from a source file server to a target file server in a data network while permitting clients to have concurrent read/write access to the file system. The method includes taking the source file server offline with respect to the client requests and directing subsequent client requests to the target file server instead of the source file server. The target file server maintains a hierarchy of nodes representing file system objects, the nodes including online nodes and offline nodes, the online nodes representing file system objects that have been transferred from the source file server to the target file server, and the offline nodes representing file system objects that have not yet been transferred from the source file server to the target file server. The target file server walks through the hierarchy of nodes and issues directory read requests and file read requests to the source file server in accordance with a network file access protocol to transfer the file system objects represented by the offline nodes from the source file server to the target file server. When a file system object has been transferred from the source file server to the target file server, the target file server changes the offline node for the object to an online node for the object. Concurrent with the transfer of the file system from the source file server to the target file server, the target file server responds to client read/write requests for access to the file system. The target file server responds by accessing objects in the target file server when the target file server has online nodes for the objects, and by fetching objects from the source file server when the target file server has offline nodes for the objects.

In accordance with yet another aspect of the invention, there is provided a network file server including data storage and at least one processor coupled to the data storage for storing and retrieving data from the data storage. The network file server is adapted for coupling to a data network for communication with network clients. The network file server is programmed with a file system program for maintaining files of data in the data storage and responding to client read/write requests for access to the files. The network file server is also programmed with a migration program for issuing directory read requests and file read requests to a source file server in accordance with a network file access protocol to migrate a file system from the source file server to the network file server while permitting the network clients to have concurrent read/write access to the file system.

In accordance with still another aspect of the invention, there is provided a network file server including data storage and at least one processor coupled to the data storage for storing and retrieving data from the data storage. The network file server is adapted for coupling to a data network for communication with network clients. The network file server is programmed with a file system program for maintaining files of data in the data storage and responding to client read/write requests for access to the files. The network file server is also programmed with a migration program integrated with the file system program for issuing directory read requests and file read requests to a source file server in accordance with a network file access protocol to migrate a file system from the source file server to the network file server while permitting the network clients to have concurrent read/write access to the file system. The migration program is executable by the network file server for maintaining a hierarchy of nodes representing file system objects, the nodes including online nodes and offline nodes, the online nodes representing file system objects that have been transferred from the source file server to the network file server, the offline nodes representing file system objects that have not yet been transferred from the source file server to the network file server. The migration program is also executable for walking through the hierarchy of nodes for issuing directory read requests and file read requests to the source file server in accordance with a network file access protocol to transfer the file system objects represented by the offline nodes from the source file server to the network file server, and when a file system object has been transferred from the source file server to the network file server, for changing the offline node for the object to an online node for the object. The migration program is also executable for responding to client read/write requests for access to the file system, concurrent with the transfer of the file system from the source file server to the network file server, by accessing objects in the network file server when the network file server has online nodes for the objects, and by fetching objects from the source file server when the network file server has offline nodes for the objects.

In accordance with still another aspect of the invention, there is provided a program storage device containing a file system migration program for a network file server. The network file server includes data storage and at least one processor coupled to the data storage for storing and retrieving data from the data storage. The network file server is adapted for coupling to a data network for communication with network clients. The network file server is programmed with a file system program for maintaining files of data in the data storage and responding to client read/write requests for access to the files. The migration program is executable by the network file server for issuing directory read requests and file read requests to a source file server in accordance with a network file access protocol to migrate a file system from the source file server to the network file server while permitting the network clients to have concurrent read/write access to the file system.

In accordance with yet another aspect of the invention, there is provided a program storage device containing a file system migration program for a network file server. The network file server includes data storage and at least one processor coupled to the data storage for storing and retrieving data from the data storage. The network file server is adapted for coupling to a data network for communication with network clients. The network file server is programmed with a file system program for maintaining files of data in the data storage and responding to client read/write requests for access to the files. The migration program is executable by the network file server and integrated with the file system program for issuing directory read requests and file read requests to a source file server in accordance with a network file access protocol to migrate a file system from the source file server to the network file server while permitting the network clients to have concurrent read/write access to the file system. The migration program is also executable by the network file server for maintaining a hierarchy of nodes representing file system objects, the nodes including online nodes and offline nodes, the online nodes representing file system objects that have been transferred from the source file server to the network file server, and the offline nodes representing file system objects that have not yet been transferred from the source file server to the network file server. The migration program is also executable by the network file server for walking through the hierarchy of nodes for issuing directory read requests and file read requests to the source file server in accordance with a network file access protocol to transfer the file system objects represented by the offline nodes from the source file server to the network file server, and when a file system object has been transferred from the source file server to the network file server, for changing the offline node for the object to an online node for the object. The migration program is also executable by the network file server for responding to client read/write requests for access to the file system, concurrent with the transfer of the file system from the source file server to the network file server, by accessing objects in the network file server when the network file server has online nodes for the objects, and by fetching objects from the source file server when the network file server has offline nodes for the objects.

BRIEF DESCRIPTION OF THE DRAWINGS

FIG. 4 is a diagram showing a Unix file system as stored on disk, including an additional file system attribute in a superblock of the file system;

FIG. 5 is a block diagram showing the construction and linkage of online inodes, offline inodes, and migration inodes in a Unix file system during migration in accordance with the preferred embodiment of the invention;

FIG. 6 is a graph showing a directory organization of the Unix file system;

Figure 1:
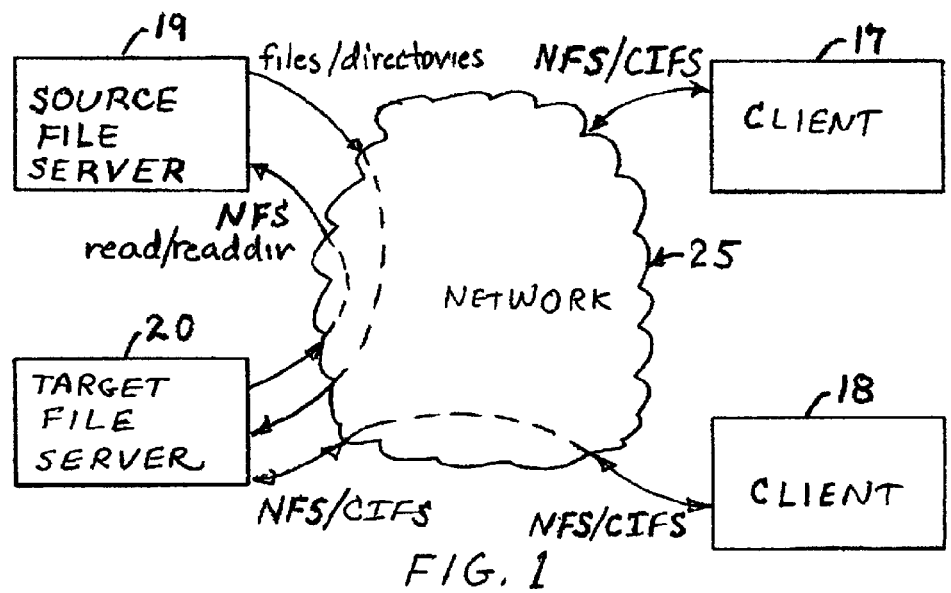
FIG. 1 is a block diagram of a data processing network in which a file system is migrated from a source file server to a target file server during concurrent client access to the target file server.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a data network 25 interconnecting clients 17, 18 to file servers 19 and 20. The clients 17, 18 access the file servers 19 and 20 using the NFS or CIFS network file access protocols. As shown, the file servers 19 and 20 are in a process of migrating a file system from the file server 19, indicated as the source file server for the migration, to the file server 20, indicated as the target file server for the migration. Such a migration is typically performed when the target file server 20 is newly added to the network, or when the source file server 19 is to be removed from the network. Migration may also be performed for load balancing between a number of file servers, by migrating a file system from a more heavily loaded file server to a less heavily loaded file server.

To perform the migration of a file system, the source file server 19 is first taken "off-line" with respect to client access of the file system, so that the source file server 19 no longer recognizes a client request for read/write access to an object of the file system. Then the target file server 20 issues network file access protocol commands to the source file server 19 to read file system objects such as directories and files from the file system being migrated. In the preferred embodiment, the network file access protocol used for migration between the file servers is NFS, although other network file access protocols, such as CIFS, could be used instead. The migration is finished when all of the objects of the file system being migrated have been transferred to the target file server.

In accordance with another aspect of the invention, the clients 17, 18 have concurrent read/write access to the file system during migration. For concurrent access, the client file access requests are received by the target file server 20, and if the target file server does not yet have a requested object of the file system, then the target file server obtains the requested object from the source file server 19 and migrates the requested object to the target file server. In this fashion, the target file server performs the requested client access upon the migrated object after the migrated object has been transferred to the target file server.

An intended application of the present invention is to enable migration of all of the files from a conventional file server in order to replace the conventional file server with a very large capacity network file server of the kind described in Vahalia et al., U.S. Pat. No. 5,893,140 issued Apr. 6, 1999, incorporated herein by reference. Such a very large capacity network file server is manufactured and sold by EMC Corporation, 171 South Street, Hopkinton, Mass., 01748-9103. In this case, migration software is installed in the very large capacity target server 20, and if CIFS or mixed NSF/CIFS file systems are to be migrated, the very large capacity target server is further modified by the addition of a supplementary NT server.

Figure 2:
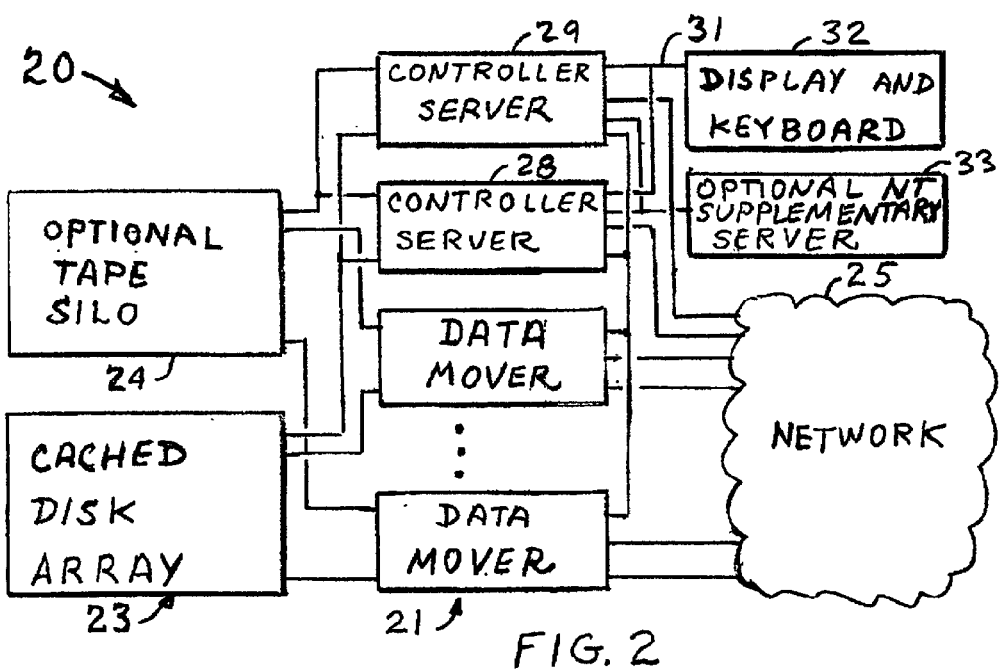
FIG. 2 is a block diagram of a preferred construction for the target file server.

With reference to FIG. 2, there is shown the modified very large capacity target server 20. The network file server 20 includes an array of data mover computers 21, a network server display and keyboard 32, a cached disk array storage subsystem 23, and an optional tape silo 24. At least two of the data movers 28, 29 are also programmed to service the network server display and keyboard 32, and these particular data movers will be referred to as controller servers. However, at any given time, only one of the controller servers 28, 29 is active in servicing the network server display and keyboard 32.

The network file server 20 is managed as a dedicated network appliance, integrated with popular network operating systems in a way, which, other than its superior performance, is transparent to the end user. The clustering of the data movers 21 as a front end to the cached disk array 23 provides parallelism and scalability. Each of the data movers 21, including the display and keyboard servers 28, 29, is a high-end commodity computer, providing the highest performance appropriate for a data mover at the lowest cost.

Because NFS does not supply NT Security Descriptors (SDs), a supplementary server 33 is used to obtain them when migrating a mixed NFS/CIFS file system. This supplementary server 33 runs on any NT machine (such as a laptop computer) with a share drive connected to the source file system. The supplementary server 33 exports a private SD interface via an ONC remote procedure call (RPC). This interface accepts a pathname and returns a serialized version of the associated SD, retrieved via the NT system call GetKernelObjectSecurity( ). As will be further described below, the directory migration program code (loaded in each of the data mover computers 21) uses this RPC interface to obtain SD's for each offline inode when the inode is created.

Figure 3:
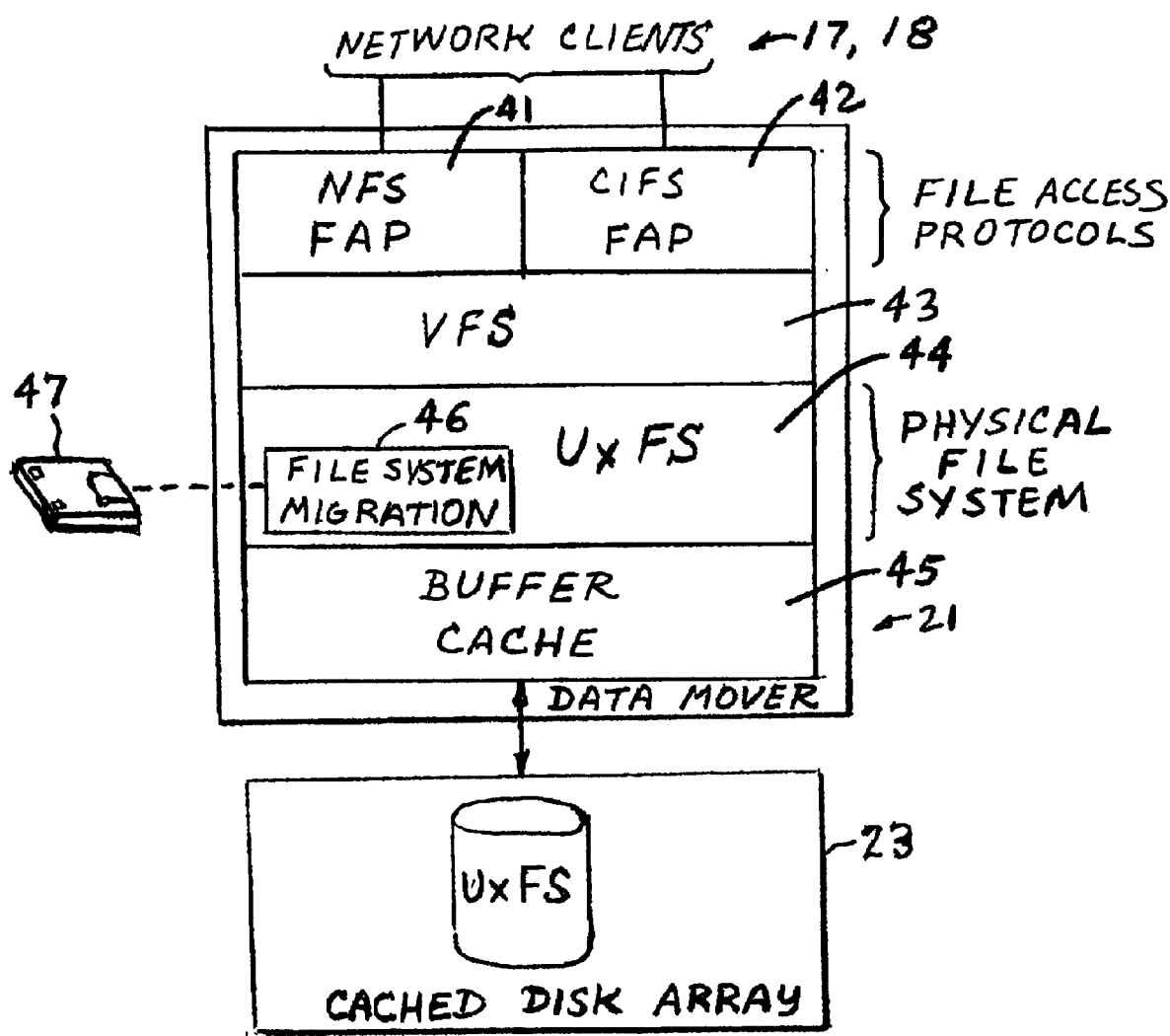
FIG. 3 is a block diagram of a preferred organization of file access software in the target file server.

Turning now to FIG. 3, there is shown a more detailed block diagram of the software structure 60 that is replicated in each data mover. The software structure includes modules for the NFS file access protocol (FAP) and the CIFS FAP, a Virtual File System (VFS) 43, and a Unix-based file system (UxFS). The Virtual File System (VFS), which is an industry-standard back-end file system switch, interfaces with the UxFS physical file system 44. VFS translates NFS Common File System requests. (The NFS Common File System Requests in themselves are translations of NFS requests to the intended physical file storage devices.) UxFS accesses buffer cache 45 during data transfers between the network clients 17, 18 and the disk storage 23 (or tape storage 24 in FIG. 2). In accordance with an aspect of the present invention, as further described below, the file system migration code 46 is integrated with the UsFS module 44. For example, the UsFS module 44, including the file system migration code 46, is read from a machine readable program storage device such as a floppy disk 47, and loaded into storage of the data mover 21.

FIG. 4 shows a Unix-based file system 50 as stored on disk. As is conventional, the file system 50 includes a boot area, a superblock 52 of attributes of the file system, an inode list 53, and data blocks 54. In accordance with an aspect of the present invention, the superblock includes an attribute 55 used as a counter to indicating the number of "offline" inodes. All changes to the value of the attribute 55 are logged (i.e., written to nonvolatile storage) in order to preserve the value in the event that the target server crashes. As will be further described below, the target server performs migration by creating "offline" inodes of the file system being migrated, and converting the "offline" inodes to a conventional inode. Migration is completed when there are no longer any offline inodes. The target server increments the counter 55 when an "offline" inode is created, and decrements the counter 55 when an "offline" inode is converted to a conventional inode. After converting an "offline" inode to a conventional inode, the migration software tests whether the counter 55 is zero to determine whether or not migration of the file system has been completed. The counter 55 is stored in the file system superblock 52 on disk in order to be preserved for recovery purposes in the event of a crash of the target server.

FIG. 5 shows various kinds of inodes that are used during migration, including online inodes 60, offline inodes 61, and migration inodes 62. Online inodes 60 represent file system objects (e.g., files and directories) which have been migrated from the source server to the target server. Offline inodes 61 represent file system objects which are either in the process of being migrated, or have not started migration. Each offline inode stores up-to-date attributes for the object it represents, but not any data block references for the object.

Before an offline inode is migrated, a temporary migration inode 62 is created to hold the object during migration. Since the migration inode holds the actual data for the object, a standard UxFS inode may be used. When the object is fully migrated, its offline inode is overwritten by the migration inode, the offline inode is switched to become an online inode, and the migration inode is de-allocated. Converting the inode atomically in this fashion aids recovery in the event of a data mover restart.

In a conventional fashion, each kind of inode has respective data attributes 64, 66, 68. The online inodes 60 and the migration inodes have conventional data block references 65, 69. In lieu of conventional data block references, however, the offline inodes 61 have an NFS file handle reference from the source server, referencing the corresponding inode in the source file server.

The online and offline nodes each have a flag (OFL_ FLAG) indicating whether or not the node is an online node or an offline node. The online and offline nodes of the file system are linked by conventional directory linkages 72. As further described below with reference to FIG. 6, the conventional directory linkages form a hierarchy beginning with the root directory for the file system. Each offline node has a pointer 73 linking it to a corresponding one of the migration inodes 62.

To find data of a file in the file system, the target server searches the conventional directory structure. If an inode for the file is found, then the OFL_FLAG is inspected. If the OFL_FLAG indicates that the inode is an online inode, then the file data is obtained from the data block references 65 in the conventional fashion. If the OFL_FLAG indicates that the inode is an offline inode, then the migration inode pointer 73 can be used to look for the file data by looking for appropriate data block references 69 in the corresponding migration inode. It is possible that the migration inode will not include appropriate data block references because the desired file data has not yet been transferred from the source file server to the target file server. If appropriate data block references cannot be found in the corresponding migration inode, then the target server reads the file handle 67 from the offline node, and uses the file handle to obtain the desired file data from the source server. In this fashion, an offline inode is migrated when an operation is invoked which requires the data portion of the inode (for example read of a file or creation of a new file in a directory). This process involves retrieving the file system object from the source file server using NFS, placing data block references in the migration inode, and converting the offline inode to an online inode by overwriting the off-line inode with the migration inode, and switching the OFL_FLAG, and deallocating the migration inode. In the case where the source file server is running on NT (which does not ordinarily support NFS), the NT supplementary server (33 in FIG. 1) exports the necessary subset of the NFS protocol.

FIG. 6 is a graph showing a directory organization of UxFS file system being migrated. The file system has a root directory 81, including references to files 82 in the root directory and references to subdirectories 83 in the root directory. Each subdirectory 83 may include its own files and subdirectories.

Figure 7:
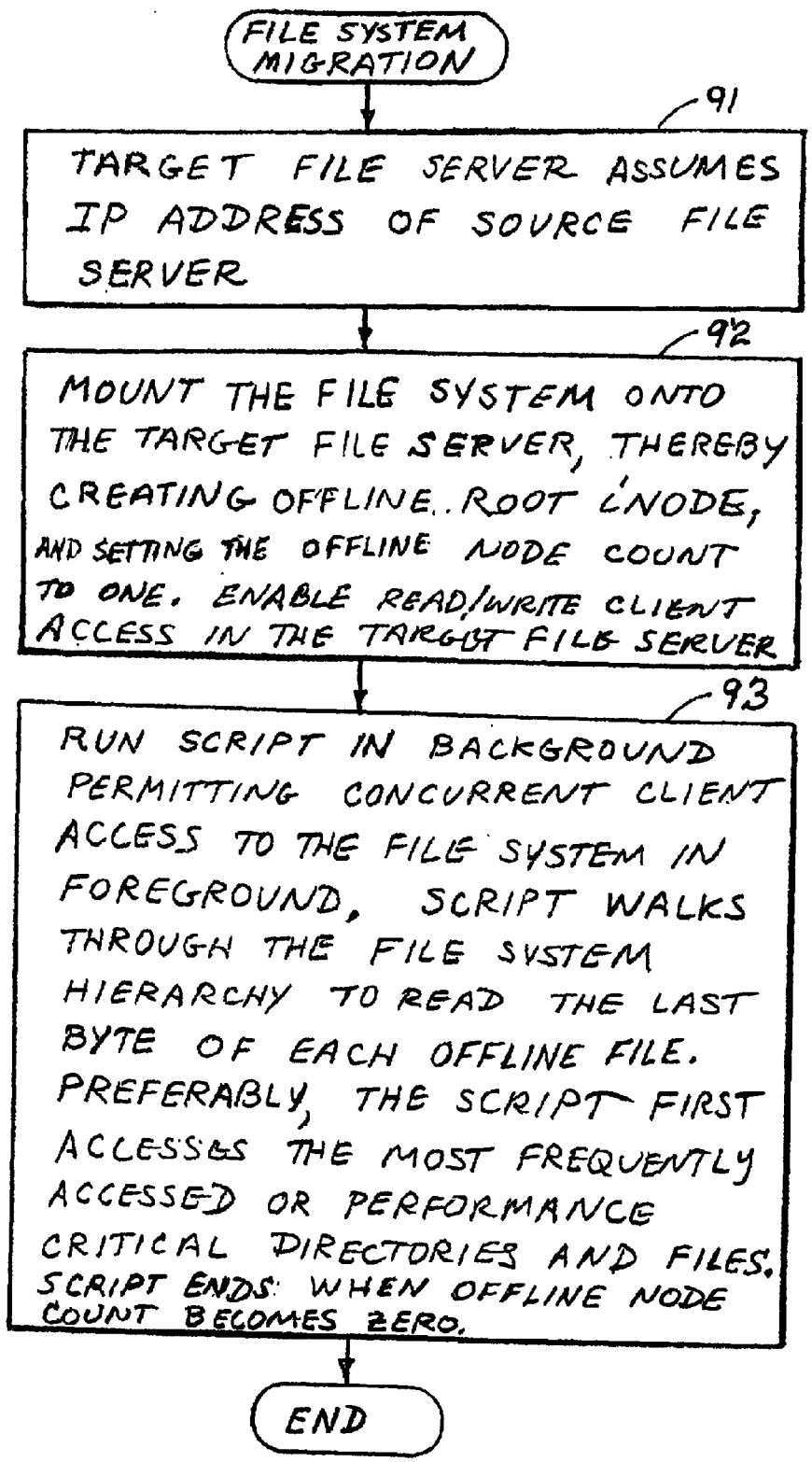
FIG. 7 is a top-level flow chart of a migration procedure in accordance with the preferred embodiment of the invention.

FIG. 7 is a top-level flow chart of a migration procedure in accordance with the preferred embodiment of the invention. In a first step 91, the target file server assumes the Internet Protocol (IP) address of the source file server. If the source needs to keep its IP address for some reason (e.g., if not all files are being migrated, or if there are other applications running on the file server host), new mount points and/or share drives are set up on all affected clients. In the source file server, the source file system is made read-only and all updates go to target file server.

In step 92, the file system is mounted onto the target file server, thereby creating an offline inode for the file system's root directory, and setting the offline node count (55 in FIG. 4) to one. At this point, the network clients are given read/write access to the file system in the target file server. Directories, files, and other file system objects are migrated from the source file server to the target file server to satisfy client requests.

Disruption to clients will occur only at the start of the migration process. Unix/NFS clients will need to remount all file systems from the source server and restart all affected applications. This is necessary because NFS file handles are server platform specific and are not transferable from one server to another. If a client does not remount the file systems and restart applications, the applications will receive "Stale NFS File Handle" errors.

NT/CIFS clients may or may not need to restart applications, depending upon whether the target file server has taken over the IP address of the source file server or not. If the target file server uses a new IP address, then the affected share drives on each client must be reconfigured and applications restarted. However, if the target file server assumes the IP address of the source file server, then the effect to applications will be equivalent to a short network outage or a reboot of the file server. Most applications should be able to tolerate this, but some may emit an "Abort, Fail, Retry?" dialog box if they attempt file access during this transition.

In step 93, the target file server runs a script as a background process, while permitting concurrent client access to the file system as a foreground process. Requests for files and directories that have not already been migrated will cause them to be migrated on demand. The script walks through the file system hierarchy to read the last byte of each offline file. Preferably, the script first accesses the most frequently accessed or performance critical directories and files. The script ends when the offline node count (55 in FIG. 4) reaches zero, indicating that the migration has been completed.

The file system in the target file server at the completion of the migration process will be the same structurally and functionally as a conventional UxFS file system. However, it is desirable to identify a file system under migration by designating a "migration" file system type specification in the superblock of the file system (52 in FIG. 4). In this case, if the file system is found outside the environment of the migration process, then the operating system or system administrator may recognize that the file system is in a special format, including the offline nodes and migration nodes. If such a "migration" file system type specification is used, then the very last step in the migration process is to erase the "migration" file type specification from the superblock. It may also be desirable to force a conversion of a "migration" type file system to a conventional UxFS file system. Such a conversion would be desirable if the source file server happens to suffer a fault precluding completion of the migration process, such as destruction of the disk memory containing the original file system. In this case, a utility converts the migration type file system to a conventional UxFS file system by removing offline inodes from the file system, and then erasing the "migration" file type specification.

Figure 8:
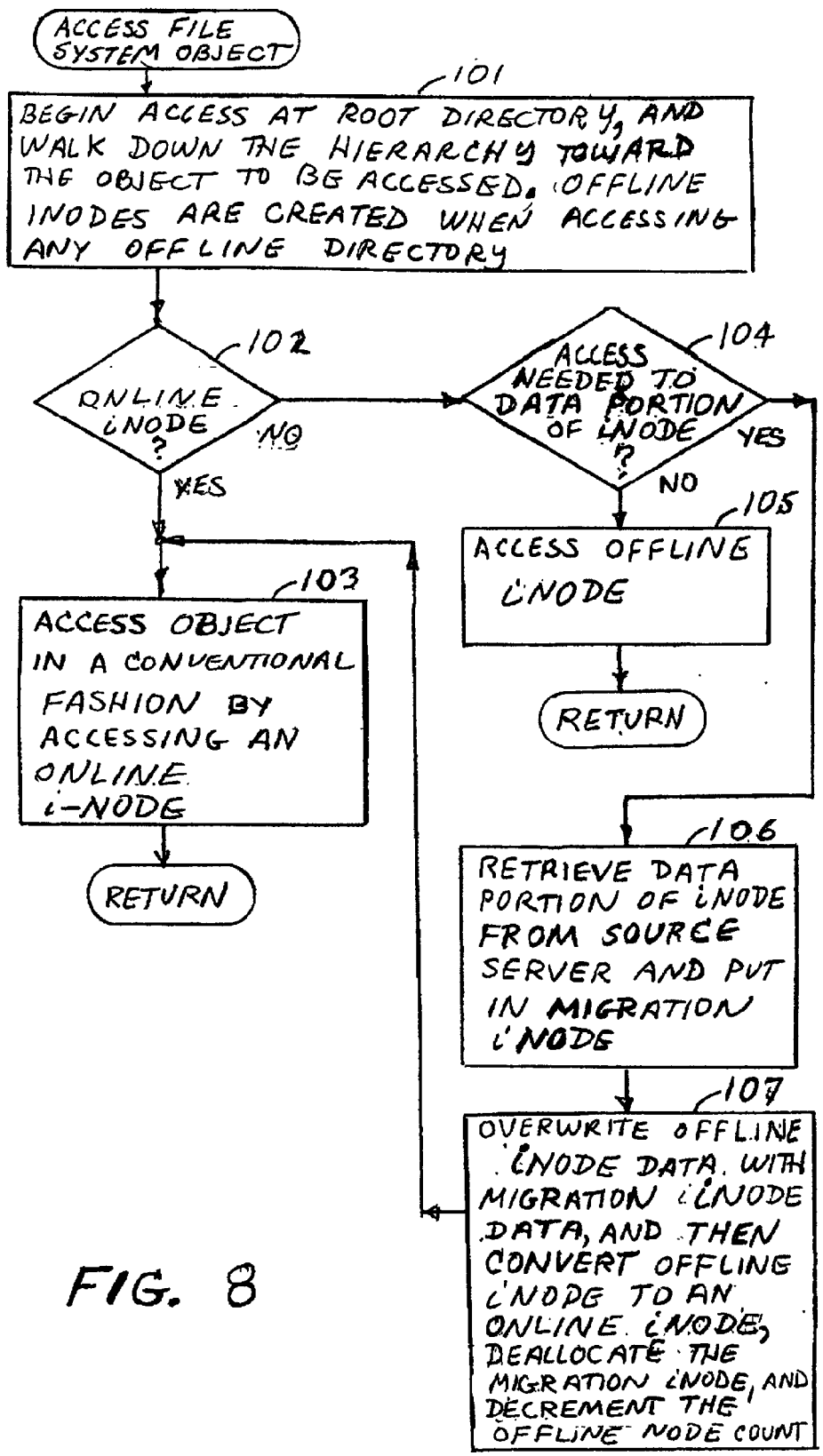
FIG. 8 is a flow chart of a procedure for accessing an object of a file system being migrated.

FIG. 8 is a flow chart of a procedure for accessing an object of a file system being migrated. In a first step 101, the target file server searches the file system directory, as introduced above with reference to FIGS. 5 and 6, to find an inode for the object. The access begins at the root directory, and a walk is performed down the hierarchy towards the object to be accessed. In this process, when any offline directory is accessed, the offline directory is migrated in a single operation by creating an offline inode for each entry. The directory is locked while being migrated, but since only the attributes for its entries are being retrieved instead of the entries themselves, the delay to applications should not be excessive. Symlinks (i.e., shortcuts) in the directory are migrated simply by retrieving the target of the link and creating an ordinary UFS symlink inode for the link. Because retrieving the target of the link requires only a single NFS call there is no reason to delay migration until the symlink is accessed. For files in the directory, an offline inode and a corresponding migration inode for the file are created. A reference (link) to the file's offline inode is placed in the directory containing the file. Other file system objects such as sockets, devices, named pipes, etc. are migrated by replicating the object in the new file system and transferring the object's general and type-specific attributes (e.g., rdev fields). The attribute values won't necessarily make sense in the new file system, but creating the object will at least provide a placeholder for manual adjustment by the system administrator. At the end of the process in step 101, there will be either an online inode or an offline inode for the object. Execution continues to step 102.

In step 102, execution continues to step 103 if an online inode is found for the object. In step 103, the object is accessed in a conventional fashion by accessing the online inode, and the procedure is finished.

In step 102, if the node for the object is not an online node (i.e., it is an offline node), execution continues to step 104. In step 104, execution continues to step 105 if access is not needed to a data portion of the inode. In step 105, the offline inode is accessed, and the procedure is finished.

In step 104, if access is needed to a data portion of the inode, then execution continues to step 106. In step 106, the target server retrieves the data portion of the inode from the source server and stores it in a migration inode. Then, in step 107, the target file server overwrites the offline inode data with the migration inode data, and then converts the offline inode to an online inode, deallocates the migration inode, and decrements the offline node count (55 in FIG. 4). (The overwrite should be done in such a way that there is no change to the access/modify time of the offline inode attributes or data.) Then, in step 103, the online inode is accessed to access the object, and the procedure is finished.

With respect to step 104 of FIG. 8, the creation of offline inodes for files in a directory is complicated by the possibility of a so-called multi-link file, which may have a reference in more than one directory. When a file is created, a reference (link) to the file's inode is placed in the directory containing the file. Hard links may be used to establish additional references from other directories. The file system as well as users and system administrators keep track of these references through a link count in the file's inode.

To migrate a directory, an offline inode is created for each file (and subdirectory) entry in the directory. Due to the possibility of files with multiple links, however, one cannot assume that directories will be migrated before the files having references in the directory. The migration software must pay special attention to files with multiple links to avoid creating multiple inodes for these files. Moreover, the possibility of multiple links must be considered during updates to the file through one of the links if these updates would affect other directory entries for the file.

Figure 9:
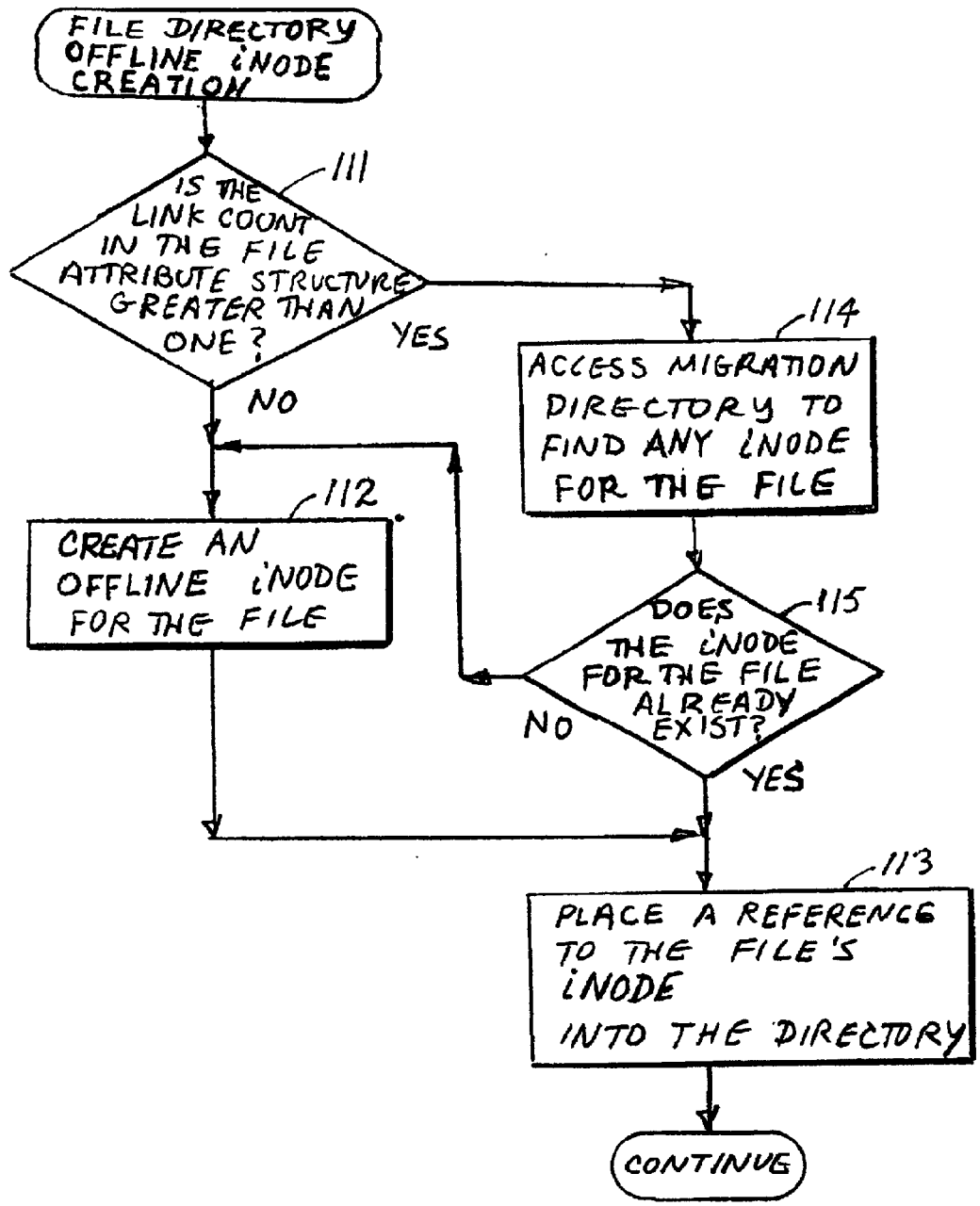
FIG. 9 is a flow chart of a procedure executed during creation of a file directory during migration.

FIG. 9 shows a flowchart of a procedure for resolving file inode references that are missing from a directory. In the first step 111, excution continues to step 112 if the link count in the file attribute structure of the file is not greater than one. In step 112, an offline inode is created for the file. Then in step 113, a reference to the file's offline inode is placed into the directory, and the procedure is finished.

If the link count is greater than one, execution branches to step 114 to access a migration directory to find any inode for the file. The migration directory is a director of migrated files having more than one link. The migration directory is updated whenever a file is migrated and the file is found to have a multi-link attribute. For example, for each migration inode having a link count greater than one, a symlink is placed in the migration directory and the source inode number is assigned as its name and the target inode number is assigned as its link value. To assure correct behavior in the event of a target server crash, the symlink should be created in the same transaction as the migration inode. To determine if an inode has already been created for a given file, and if so, to get the corresponding target server inode number, a lookup is performed on the migration directory using the source inode number.

In step 115, execution branches to step 112 to create an offline inode for the file if the inode for the file does not already exist. If the inode for the file already exists, then in step 113 a reference to the file's inode is placed into the directory.

The procedure of FIG. 8 suffers a disadvantage for the migration of large files. In this case, the continuous transfer of the entire files in step 107 would cause applications attempting to open the files to block for an inordinate amount of time. One solution to this problem is to migrate only what is absolutely necessary to handle a file access request. For write operations no migration would be necessary, and for read operations only the requested byte range need be migrated. This strategy, however, would add significant complexity to the code and is probably unnecessary since most files are read sequentially. A preferred solution is an intermediate strategy of migrating up to and including the byte range covered by each request.

Figure 10:
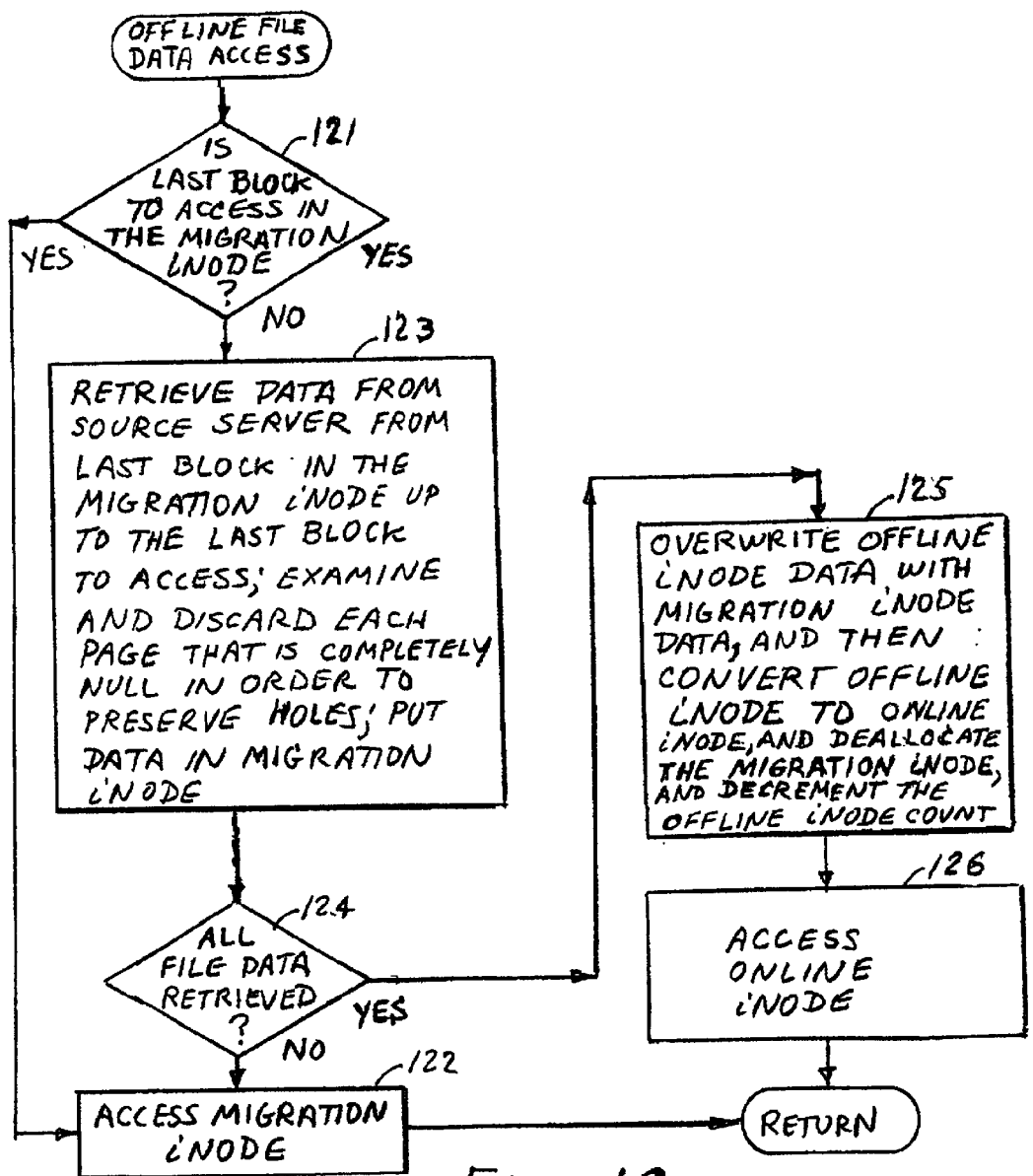
FIG. 10 is a flow chart of a procedure for accessing an off-line file during migration.

FIG. 10 shows a flowchart of the preferred procedure for read/write data access to an offline file. In a first step 121, execution branches to step 122 if the last block to access is in the migration inode for the offline file. In step 122, the migration inode is accessed to perform the read/write operation, and the procedure is finished.

In step 121, if the last block to access is not in the migration inode, then execution branches to step 123. In step 123, file data is retrieved from the source server from the last block in the migration inode up to the last file block to be accessed. The retrieved data are examined to discard each page that is completely null in order to preserve holes. (Holes are missing pages or blocks of file data that are presumed to be null.) The remaining data are put in the migration inode. After step 123, execution continues to step 124.

In step 124, if all of the file data have been retrieved, then execution continues to step 125. In step 125 (which is similar to step 107 of FIG. 8), the offline inode data are overwritten with the migration inode data, and then the offline inode is converted to an online inode, the migration inode is deallocated, and the offline node count (55 in FIG. 4) is decremented. Then in step 126, the online inode is accessed for the read/write operation, and the procedure is finished.

In the preferred embodiment, as introduced above with respect to FIG. 3, the file system migration code 46 is integrated with the Unix-based file system (UxFS) code 44. The preferred method of performing this integration is to write migration source code that intercepts UxFS function calls that access the UxFS inode data objects, and then to compile the UxFS code with the migration source code to produce integrated physical file system object code. The UxFS source code and the migration source code is written in the C++ programming language. The C++ programming language supports object-oriented programming techniques, including the declaration of object classes and functions associated with the object classes.

Figure 11:
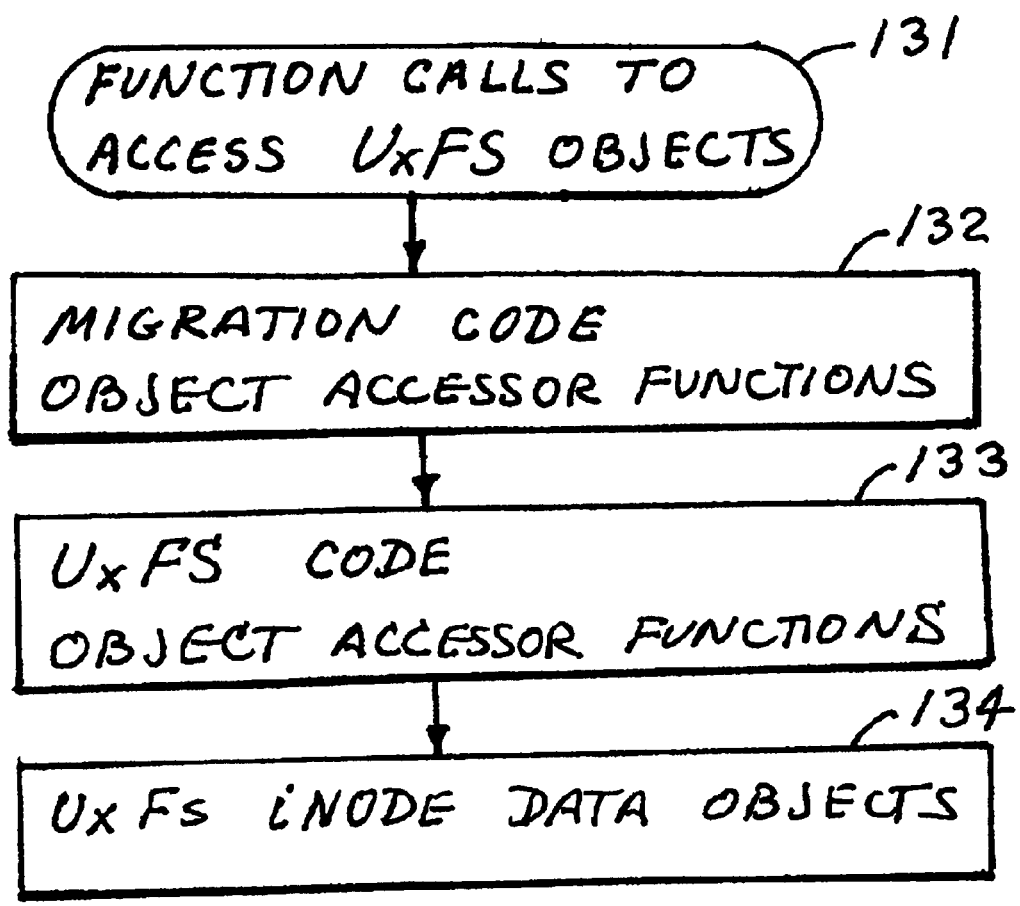
FIG. 11 is a block diagram showing the interposition of migration code object accessor functions in the function call path to Unix-based File System accessor functions in the preferred embodiment of the invention.

As shown in FIG. 11, the UxFS code includes function calls 131 to access UxFS objects. Normally these function calls directly invoke the UxFS code object accessor functions 133, which access the UxFS inode data objects. To integrate the migration code with the UxFS code, the migration code includes object accessor functions 132 that intercept the function calls 131 to the UxFS object accessor functions 133. The migration object accessor functions determine whether or not to call the UxFS code object accessor functions for the case when the objects are on-line inodes, or whether the offline inodes or migration inodes need to be accessed or modified in accordance with the procedures of FIGS. 8 to 10.

In the UxFS source code, the UxFS inodes are in a class named UFS_Vnode. The migration code introduces an additional object class named MGFS_Vnode. In accordance with the C++ programming language, class functions are identified by a pair of colons interposed between the class name and a function name. The UxFS inode structure is extended to support offline inodes, by using one of the bits in UxFS inode flags to designate an offline inode. In addition, the following structure is used to define the additional attributes associated with offline inodes:

```
struct di_Mmigration {
    u_short type;     // 0: the type of addressing
scheme
    u_short len;      // 2: the length of the
address to follow
    ino_t minode;     // 4: the migration
(temporary) mode
    ino_t pinode;     // 8: parent of inode
    char    data [MAX MIGRATION_DATA_SIZE]; // 12: data
(72 bytes)
    // total 84 bytes
};
```

The UxFS should not need to be modified to understand this offline inode structure, because only the migration code should be active when this structure is present.

The general approach to directory migration is as follows. When a directory is offline and needs to be accessed, one or more calls to the NFS READDIR+ function are invoked to retrieve all the needed information about the contents of the directory to be made online. This information is then used to create the appropriate on-disk structures.

The function (MGFS_Vnode::dirMigrate and MGFS_Vnode::migrateNFSEntry) migrates a directory. It uses NFS to retrieve directory information, extracts that information into attributes (vattr) then calls individual functions to do the work of migrating files, directories, symlinks, or other object types.

To migrate file entries (as implemented in MGFS_Vnode::migrateFileEntry), we create an offline file inode in the migration inode of this directory for a file with the attributes specified in the vattr structure passed in. A modified file create is used, plus the new ability to store opaque data in an inode to create the file with the correct attributes and migration data in one transaction. None of the data contained within the file is migrated until the file is accessed.

To migrate directory entries (as implemented in MGFS_Vnode::migrateDirEntry), an offline directory inode is created in the migration inode of this directory with the attributes specified in the vattr structure passed in. The contents of the directory will be filled in when the directory is accessed.

Some extra work is done when migrating directory entries beyond the work done in creating file entries. This is related to the "." and ".." directory entries that are set in the migration inode, and should reflect its final destination as a normal online inode. When a directory entry is created, the parent inode number is stored in the pinode field of the di_Mmigration data structure. When this new directory entry is first accessed and migration begins, the parent inode number is given to the migration inode so that "." and ".." can be correctly created. When the new node is brought online, these links will be correct.

To migrate symbolic links (as implemented in MGFS_Vnode::migrateSymLinkEntry), the migration code simply creates the link as a child of the migration inode with the attributes passed in. Since migrating the link involves a single NFS call (READLINK), there is no reason to postpone it. Thus, in contrast to file and directory migration we create an ordinary online UFS inode here and not an offline one.

In order to migrate directories, the migration code is interposed between any request for directory accesses and the actual accesses themselves. A directory is fully migrated before any access is allowed. In order to accomplish this, the migration code overrides each directory access function in the subclass to first call the migrate function, and then to invoke the superclass's fumctionality. The following functions in UFS_Vnode are made virtual to accomplish this:

```
    virtual File_Status create(const File_NameComponent*
comp, vattr* vap,
                     VFS_Vnode*&
result,SDStorageHeader* sd=NULL);
    virtual File_Status mkdir(const File NameComponent*
comp, vattr* vap,
                     VFS_Vnode*&
result,SDStorageHeader* sd=NULL);
    virtual VFS_Vnode* lookupComp (const
File_NameComponent*, File_Status&);
    virtual File_Status create (const File_NameComponent*
comp, u_short mode,
                     uid_t, gid_t, ByteIndex,
VFS_Vnode*& result);
    virtual File_Status create (const File_NameComponent*
comp, u_short mode,
                     uid_t, gid_t, VFS_Vnode*&
result);
    virtual File_Status remove (const File_NameComponent*,
VFS_Vnode*);
    virtual File_Status link (const File_NameComponent*
targetName,
                     VFS_Vnode* node);
    virtual File_Status mkdir (const File_NameComponent*
comp, u_short mode,
                     uid_t, gid_t, VFS_Vnode*&
result);
    virtual File_Status rmdir (const File_NameComponent*
comp, VFS_Vnode*);
    virtual File_Status symlink (const File_NameComponent*
comp, u_short mode,
                     uid_t, gid_t, const char*
value, VFS_Vnode*&);
    virtual File_Status readdir(File_DirPosition, int
maxLength,
                     char* nameBuffer, long&
fileId,
                     File_DirPosition& next,
boolean_t& readEOF);
```

To migrate the data within any file, a function is used to retrieve data from NFS up to a given block index. Writes beyond the NFS file's size will cause the entire file to be migrated, then the write to be handled as usual. To preserver holes, blocks that contain entirely zero data will be skipped, causing a hole to form. File migration is implemented in the MGFS_Vnode::migrateToBlock function.

File truncation and extension are handled specially by the Data Migration file system's vnodes. The source's size and the current amount migrated are used to determine what operation must be done. The following pseudo code illustrates the method.

```
MGFS_Vnode::setLength(ByteIndex bi)
{
    if (bi < this.size)
        // This is file truncation
        if (bi > migNode.size) }
            // we haven't migrated up to this point
            set this.size to bi to stop migrating when bi
is reached.
        } else {
            // we have migrated at least up to bi
            migNode.setLength(bi); // normal truncate-
```

-continued

```
migration done
            overwrite inode with migNode (bring online)
            free migNode
        }
    } else {
        // We're extending this file-migrate whole file
before changing
            migrateToBlock(block of this.size);
            overwrite inode with migNode (bring online)
            free migNode
            UFS_Vnode::setLength(bi);
```

As in the directory migration above, code is interposed between the call to—and implementation of—functions that make use of the contents of files. To accomplish this, more functions are made virtual in UFS_Vnode.

```
    virtual Buffer_Cached* blockRead(BlockIndex,
File_Status&);
    virtual File_Status blockReadAhead(BlockIndex,
VFS_ReadCallBack*,
                     Buffer_Cached*&);
    virtual File_Status setLength(ByteIndex);
    virtual File_Status lastBlockWrite (BlockIndex,
ByteIndex, Buffer_Cached*,
                     void* writeDesc);
    virtual File_Status blockChainWrite (int numToFree,
BlockChain* bc);
    virtual File_Status blockChainWrite (int numToFree,
BlockChain* bc,
                     int chainLength);
```

The interposition of the migrate code then resembles the following:

```
Buffer_Cached*
MGFS_Vnode::blockRead(BlockIndex bi, File_Status& error)
{
    Buffer_Cached* bcPtr = NULL;
    if (isOffline()) {
        // Migrate this file up to bi
        migrateToBlock(bi);
        bcPtr = migNode->blockRead(bi, error);
    } else {
        bcPtr = UFS_Vnode::blockRead(bi, error);
    }
    return bcPtr;
}
```

This is different from the simple case with directory migration in order to perform file operations on files that are only partially migrated.

As introduced above, migration inodes are temporary inodes that persist only while a migration is in progress. They are created at the beginning of the migration of the contents of a filesystem object (directory or file) and are removed (released) after the object contents have been completely migrated and the migration inode has been copied over the offline inode, bringing it online. A technique is put into place to allocate, deallocate, and copy these inodes.

Migration modes are allocated by using the getChildNode function of the UFS_Vnode. These inodes are free standing and disconnected from the file system hierarchy. Inode allocation is handled in the function MGFS_Vnode::createMigrationVnode.

The final (two) step(s) in the migration of a filesystem object is (are) to copy the migration inode over the offline inode and to reset the attributes of the now online inode to those of its NFS source. This is accomplished by copying only the extents information from the migration inode over the address information of the offline inode, and fixing up the size. This operation is implemented in the function MGFS_Vnode::getOnline( ).

In view of the above, there has been described a method of migrating a file system from a source file server to a target file server in a data network while permitting clients to have concurrent read/write access to the file system. The target file server issues directory read requests and file read requests to the source file server in accordance with a network file access protocol to transfer the file system from the source file server to the target file server. Concurrent with the transfer of the file system from the source file server to the target file server, the target file server responds to client read/write requests for access to the file system. In a preferred embodiment, the target file server maintains a hierarchy of on-line nodes off-line nodes. The online nodes represent file system objects that have been completely migrated, and the offline nodes representing file system objects that have not been completely migrated. The target file server executes a background process that walks through the hierarchy in order to migrate the objects of the offline nodes. When an object has been completely migrated, the target file server changes the offline node for the object to an online node for the object.

What is claimed is:

1. A method of migrating a file system from a source file server to a target file server in a data network while permitting clients to have concurrent read/write access to the file system, said method comprising:

the target file server issuing directory read requests and file read requests to the source file server in accordance with a network file access protocol to transfer the file system from the source file server to the target file server, and concurrent with the transfer of the file system from the source file server to the target file server, the target file server responding to client read/write requests for access to the file system.

2. The method as claimed in claim 1, wherein the source server initially has an Internet Protocol (IP) address for receiving client requests for access to the file system, and wherein the method includes taking the source file server offline with respect to the client requests and directing subsequent client requests to the target file server instead of the source file server by the target file server assuming the Internet Protocol (IP) address of the source file server.

3. The method as claimed in claim 1, wherein the target file server responds to a client request for access to an object of the file system by checking whether the object is in the target file server, and if the object is not in the target file server, fetching the object from the source file server and then accessing the object in the target file server once the object has been transferred to the target file server.

4. The method as claimed in claim 3, wherein the object is accessed in the target file server by calling an object accessor function of a file system program in the target file server, and wherein the checking of whether the object is in the target file server includes calling an object accessor function of migration code programming that is integrated with the file system program.

5. The method as claimed in claim 4, wherein the object accessor function of the migration code programming intercepts a call from the file system program that would, in the absence of migration being performed, call the object accessor function of the file system program.

6. A method of migrating a file system from a source file server to a target file server in a data network while permitting clients to have concurrent read/write access to the file system, said method comprising:

the target file server issuing directory read requests and file read requests to the source file server in accordance with a network file access protocol to transfer the file system from the source file server to the target file server, and concurrent with the transfer of the file system from the source file server to the target file server, the target file server responding to client read/write requests for access to the file system;

wherein the target file server responds to a client request for access to an object of the file system by checking whether the object is in the target file server, and if the object is not in the target file server, fetching the object from the source file server and then accessing the object in the target file server once the object has been transferred to the target file server; and wherein the file system includes nodes in a hierarchy of directories, the file system in the target file server includes online nodes and offline nodes, the online nodes representing objects that have been transferred from the source file server to the target file server, the offline nodes representing objects that have not yet been transferred from the source file server to the target file server, and wherein the target file server checks whether the object is in the target file server by checking whether the target file server has an online node for the object.

7. The method as claimed in claim 6, wherein the target file server does not have an online node for the object, and fetches data for the object from the source file server, writes the data in an offline node for the object, and then changes the offline node to an online node.

8. The method as claimed in claim 7, wherein the offline node is changed to an online node by switching a flag for the offline node, the flag indicating either an offline node or an online node.

9. The method as claimed in claim 6, wherein the object is a file, and wherein the target file server fetches, from the source file server, file data from the beginning of the file up to the last byte of the file data to be accessed in response to the client request for access.

10. The method as claimed in claim 9, wherein the target file server places the file data in a migration node in the target file server, and once all of the file data are placed in the migration node, an offline node for the file is overwritten with the migration node, and then the offline node for the file is changed to an online node for the file.

11. The method as claimed in claim 6, wherein the object is a file directory including at least one file, and the method includes the target file system checking a link count attribute for the file, and upon finding that the link count attribute has a value greater than one, accessing a migration directory to find a node for the file, and placing a reference to the node for the file in the file directory.

12. The method as claimed in claim 6, wherein the target file server executes a routine that walks through the hierarchy of directories to read the last byte of at least each offline file.

13. The method as claimed in claim 6, wherein the target file server maintains a count of the number of offline nodes for the file system, the count being decremented when an offline node is changed to an online node, and the target file server recognizing that migration of the file system is finished when the count becomes zero.

14. A method of migrating a file system from a source file server to a target file server in a data network while permitting clients to have concurrent read/write access to the file system, said method comprising:

taking the source file server offline with respect to the client requests and directing subsequent client requests to the target file server instead of the source file server;

the target file server maintaining a hierarchy of nodes representing file system objects, the nodes including online nodes and offline nodes, the online nodes representing file system objects that have been transferred from the source file server to the target file server, the offline nodes representing file system objects that have not yet been transferred from the source file server to the target file server, the target file server walking through the hierarchy of nodes and issuing directory read requests and file read requests to the source file server in accordance with a network file access protocol to transfer the file system objects represented by offline nodes from the source file server to the target file server, and when a file system object has been transferred from the source file server to the target file server, the target file system changing the offline node for the object to an online node for the object, and concurrent with the transfer of the file system from the source file server to the target file server, the target file server responding to client read/write requests for access to the file system, the target file server responding by accessing objects in the target file server when the target file server has online nodes for the objects, and by fetching objects from the source file server when the target file server has offline nodes for the objects.

15. The method as claimed in claim 14, wherein the source server initially has an Internet Protocol (IP) address for receiving client requests for access to the file system, and the source file server is taken offline with respect to the client requests and subsequent client requests are directed to the target file server instead of the source file server by the target file server assuming the Internet Protocol (IP) address of the source file server.

16. The method as claimed in claim 14, wherein the objects are accessed in the target file server by calling an object accessor function of a file system program in the target file server, and wherein the target file server responds to the client read/write requests by calling an object accessor function of migration code programming that is integrated with the file system program.

17. The method as claimed in claim 16 wherein the object accessor function of the migration code programming intercepts calls from the file system program that would, in the absence of migration being performed, call the object accessor function of the file system program.

18. The method as claimed in claim 14, wherein the offline node for the object is changed to an online node for the object by switching a flag for the offline node, the flag indicating either an offline node or an online node.

19. The method as claimed in claim 14, wherein the object is a file, and wherein the target file server fetches, from the source file server, file data from the beginning of the file up to the last byte of the file data to be accessed in response to the client request for access.

20. The method as claimed in claim 19 wherein the target file server places the file data in a migration node in the target file server, and once all of the file data are placed in the migration node, an offline node for the file is overwritten with the migration node, and then the offline node for the file is changed to an online node for the file.

21. The method as claimed in claim 14, wherein the object is a file directory including at least one file, and the method includes the target file system checking a link count attribute for the file, and upon finding that the link count attribute has a value greater than one, accessing a migration directory to find a node for the file, and placing a reference to the node for the file in the file directory.

22. The method as claimed in claim 14, wherein the target file server executes a background routine that walks through the hierarchy of nodes to find nodes representing files, and upon finding a node representing a file, performs a read operation including a read of the last byte of the file.

23. The method as claimed in claim 14 wherein the target file server maintains a count of the number of offline nodes for the file system, the count being decremented when an offline node is changed to an online node, and the target file server recognizing that migration of the file system is finished when the count becomes zero.

24. A network file server comprising data storage and at least one processor coupled to the data storage for storing and retrieving data from the data storage, the network file server being adapted for coupling to a data network for communication with network clients, the network file server being programmed with a file system program for maintaining files of data in the data storage and responding to client read/write requests for access to the files, the network file server also being programmed with a migration program for issuing directory read requests and file read requests to a source file server in accordance with a network file access protocol to migrate a file system from the source file server to the network file server while permitting the network clients to have concurrent read/write access to the file system.

25. The network file server as claimed in claim 24, wherein the file system program is a Unix-based file system program, and the migration program is integrated with the file system program.

26. The network file server as claimed in claim 24, wherein the network file server is programmed to respond to a client request for access to an object of the file system by checking whether the object is in the network file server, and if the object is not in the network file server, fetching the object from the source file server and then accessing the object in the network file server once the object has been transferred to the network file server.

27. The network file server as claimed in claim 26, wherein the network file server is programmed to access the object by calling an object accessor function of the file system program, and to check whether the object is in the network file server by calling an object accessor function of the migration program.

28. The network file server as claimed in claim 27, wherein the object accessor function of the migration program intercepts calls from the file system program that would, in the absence of migration being performed, call the object accessor function of the file system program.

29. A network file server comprising data storage and at least one processor coupled to the data storage for storing and retrieving data from the data storage, the network file server being adapted for coupling to a data network for communication with network clients, the network file server being programmed with a file system program for maintaining files of data in the data storage and responding to client read/write requests for access to the files, the network file server also being programmed with a migration program for issuing directory read requests and file read requests to a source file server in accordance with a network file access protocol to migrate a file system from the source file server to the network file server while permitting the network clients to have concurrent read/write access to the file system;

wherein the network file server is programmed to respond to a client request for access to an object of the file system by checking whether the object is in the network file server, and if the object is not in the network file server, fetching the object from the source file server and then accessing the object in the network file server once the object has been transferred to the network file server; and wherein the file system includes nodes in a hierarchy of directories, the file system in the network file server includes online nodes and offline nodes, the online nodes representing objects that have been transferred from the source file server to the network file server, the offline nodes representing objects that have not yet been transferred from the source file server to the network file server, and wherein the network file server is programmed to check whether the object is in the network file server by checking whether the network file server has an online node for the object.

30. The network file server as claimed in claim 29, wherein the network file server is programmed to fetch data for offline nodes from the source file server, and to write the fetched data in the offline node for the object, and then change the offline node to an online node.

31. The network file server as claimed in claim 30, wherein the network file server is programmed to change the offline node to an online node by switching a flag for the offline node, the flag indicating either an offline node or an online node.

32. The network file server as claimed in claim 29, wherein the object is a file, and wherein the network file server is programmed to fetch, from the source file server, file data from the beginning of the file up to the last byte of the file data to be accessed in response to the client request for access.

33. The network file server as claimed in claim 32, wherein the network file server is programmed to place the fetched file data in a migration node in the network file server, and once all of the file data are placed in the migration node, an offline node for the file is overwritten with the migration node, and then the offline node for the file is changed to an online node for the file.

34. The network file server as claimed in claim 29, wherein the object is a file directory including at least one file, and the network file server is programmed to check a link count attribute for the file, and upon finding that the link count attribute has a value greater than one, to access a migration directory to find a node for the file, and place a reference to the node for the file in the file directory.

35. The network file server as claimed in claim 29, wherein the network file server is programmed for walking through the hierarchy of directories and for performing read operations including a read of the last byte of at least each offline file.

36. The network file server as claimed in claim 29, wherein the network file server is programmed for maintaining a count of the number of offline nodes for the file system, for decrementing the count when an offline node is changed to an online node, and for recognizing that migration of the file system is finished when the count becomes zero.

37. A network file server comprising data storage and at least one processor coupled to the data storage for storing and retrieving data from the data storage, the network file server being adapted for coupling to a data network for communication with network clients, the network file server being programmed with a file system program for maintaining files of data in the data storage and responding to client read/write requests for access to the files, the network file server also being programmed with a migration program integrated with the file system program for issuing directory read requests and file read requests to a source file server in accordance with a network file access protocol to migrate a file system from the source file server to the network file server while permitting the network clients to have concurrent read/write access to the file system, the migration program being executable by the network file server for:

maintaining a hierarchy of nodes representing file system objects, the nodes including online nodes and offline nodes, the online nodes representing file system objects that have been transferred from the source file server to the network file server, the offline nodes representing file system objects that have not yet been transferred from the source file server to the network file server, walking through the hierarchy of nodes and issuing directory read requests and file read requests to the source file server in accordance with a network file access protocol to transfer the file system objects represented by the offline nodes from the source file server to the network file server, and when a file system object has been transferred from the source file server to the network file server, f6r changing the offline node for the object to an online node for the object, and responding to client read/write requests for access to the file system, concurrent with the transfer of the file system from the source file server to the network file server, by accessing objects in the network file server when the network file server has online nodes for the objects, and by fetching objects from the source file server when the network file server has offline nodes for the objects.

38. The network file server as claimed in claim 37, wherein the file system program has an object accessor function, and the migration program has an object accessor function that intercepts calls from the file system program that would, in the absence of migration being performed, call the object accessor function of the file system program.

39. The network file server as claimed in claim 37, wherein the migration program changes the offline node for the object to an online node for the object by switching a flag for the offline node, the flag indicating either an offline node or an online node.

40. The network file server as claimed in claim 37, wherein the network file server is programmed to respond to a client request for access to a file in the file system by fetching, from the source file server, file data from the beginning of the file up to the last byte of the file data to be accessed in response to the client request for access.

41. The network file server as claimed in claim 40 wherein the network file server is programmed to place the file data in a migration node in the network file server, and once all of the file data are placed in the migration node, to overwrite an offline node for the file with the migration node, and then to change the offline node for the file to an online node for the file.

42. The network file server as claimed in claim 37, wherein the network file server is programmed to migrate a file directory by checking a link count attribute for the file, and upon finding that the link count attribute has a value greater than one, accessing a migration directory to find a node for the file, and placing a reference to the node for the file in the file directory.

43. The network file server as claimed in claim 37, wherein the network file server is programmed for walking through the hierarchy of directories to find nodes representing files, and upon finding a node representing a file, for performing a read operation including a read of the last byte of the file.

44. The network file server as claimed in claim 37, wherein the network file server is programmed for maintaining a count of the number of offline nodes for the file system, decrementing the count when an offline node is changed to an online node, and recognizing that migration of the file system is finished when the count becomes zero.

45. A program storage device containing a file system migration program for a network file server, the network file server including data storage and at least one processor coupled to the data storage for storing and retrieving data from the data storage, the network file server being adapted for coupling to a data network for communication with network clients, the network file server being programmed with a file system program for maintaining files of data in the data storage and responding to client read/write requests for access to the files, wherein the migration program is executable by the network file server for issuing directory read requests and file read requests to a source file server in accordance with a network file access protocol to migrate a file system from the source file server to the network file server while permitting the network clients to have concurrent read/write access to the file system.

46. The program storage device as claimed in claim 45, wherein the file system program is a Unix-based file system program, and the migration program is integrated with the file system program.

47. The program storage device as claimed in claim 45, wherein the migration program is executable by the network file server for responding to a client request for access to an object of the file system by checking whether the object is in the network file server, and if the object is not in the network file server, fetching the object from the source file server and then accessing the object in the network file server once the object has been transferred to the network file server.

48. The program storage device as claimed in claim 47, wherein the migration program has an object accessor function executable by the network file server for accessing the object by calling an object accessor function of the file system program, and for checking whether the object is in the network file server by calling an object accessor function of the migration program.

49. The program storage device as claimed in claim 48, wherein the object accessor function of the migration program intercepts calls from the file system program that would, in the absence of migration being performed, call the object accessor function of the file system program.

50. A program storage device containing a file system migration program for a network file server, the network file server including data storage and at least one processor coupled to the data storage for storing and retrieving data from the data storage, the network file server being adapted for coupling to a data network for communication with network clients, the network file server being programmed with a file system program for maintaining files of data in the data storage and responding to client read/write requests for access to the files, wherein the migration program is executable by the network file server for issuing directory read requests and file read requests to a source file server in accordance with a network file access protocol to migrate a file system from the source file server to the network file server while permitting the network clients to have concurrent read/write access to the file system;

wherein the migration program is executable by the network file server for responding to a client request for access to an object of the file system by checking whether the object is in the network file server, and if the object is not in the network file server, fetching the object from the source file server and then accessing the object in the network file server once the object has been transferred to the network file server; and wherein the file system includes nodes in a hierarchy of directories, the file system in the network file server includes online nodes and offline nodes, the online nodes representing objects that have been transferred from the source file server to the network file server, the offline nodes representing objects that have not yet been transferred from the source file server to the network file server, and wherein the migration program is executable by the network file server for checking whether the object is in the network file server by checking whether the network file server has an online node for the object.

51. The program storage device as claimed in claim 50, wherein the migration program is executable by the network file server for fetching data for offline nodes from the source file server, and writing the fetched data in the offline node for the object, and then changing the offline node to an online node.

52. The program storage device as claimed in claim 51, wherein the migration program is executable by the network file server for changing the offline node to an online node by switching a flag for the offline node, the flag indicating either an offline node or an online node.

53. The program storage device as claimed in claim 50, wherein the object is a file, and wherein the migration program is executable by the network file server for fetching, from the source file server, file data from the beginning of the file up to the last byte of the file data to be accessed in response to the client request for access.

54. The program storage device as claimed in claim 53, wherein the migration program is executable by the network file server for placing the fetched file data in a migration node in the network file server, and once all of the file data are placed in the migration node, for overwriting an offline node for the file with the migration node, and then changing the offline node for the file to an online node for the file.

55. The program storage device as claimed in claim 50, wherein the object is a file directory including at least one file, and the migration program is executable by the network file server for checking a link count attribute for the file, and upon finding that the link count attribute has a value greater than one, for accessing a migration directory to find a node for the file, and placing a reference to the node for the file in the file directory.

56. The program storage device as claimed in claim 50, wherein the migration program is executable by the network files server for walking through the hierarchy of directories to read the last byte of at least each offline file.

57. The program storage device as claimed in claim 50, wherein the migration program is executable by the network file server for maintaining a count of the number of offline nodes for the file system, for decrementing the count when an offline node is changed to an online node, and for recognizing that migration of the file system is finished when the count becomes zero.

58. A program storage device containing a file system migration program for a network file server, the network file server including data storage and at least one processor coupled to the data storage for storing and retrieving data from the data storage and, the network file server being adapted for coupling to a data network for communication with network clients, the network file server being programmed with a file system program for maintaining files of data in the data storage and responding to client read/write requests for access to the files, the migration program being executable by the network file server and being integrated with the file system program for issuing directory read requests and file read requests to a source file server in accordance with a network file access protocol to migrate a file system from the source file server to the network file server while permitting the network clients to have concurrent read/write access to the file system, the migration program being executable by the network file server for:

maintaining a hierarchy of nodes representing file system objects, the nodes including online nodes and offline nodes, the online nodes representing file system objects that have been transferred from the source file server to the network file server, the offline nodes representing file system objects that have not yet been transferred from the source file server to the network file server, walking through the hierarchy of nodes for issuing directory read requests and file read requests to the source file server in accordance with a network file access protocol to transfer the file system objects represented by the offline nodes from the source file server to the network file server, and when a file system object has been transferred from the source file server to the network file server, for changing the offline node for the object to an online node for the object, and responding to client read/write requests for access to the file system, concurrent with the transfer of the file system from the source file server to the network file server, by accessing objects in the network file server when the network file server has online nodes for the objects, and by fetching objects from the source file server when the network file server has offline nodes for the objects.

59. The program storage device as claimed in claim 58, wherein the file system program has-an object accessor function, and the migration program has an object accessor function that intercepts calls from the file system program that would, in the absence of migration being performed, call the object accessor function of the file system program.

60. The program storage device as claimed in claim 58, wherein the migration program is executable by the network file server for changing the offline node for the object to an online node for the object by switching a flag for the offline node, the flag indicating either an offline node or an online node.

61. The program storage device as claimed in claim 58, wherein the migration program is executable by the network file server for responding to a client request for access to a file in the file system by fetching, from the source file server, file data from the beginning of the file up to the last byte of the file data to be accessed in response to the client request for access.

62. The program storage device as claimed in claim 61 wherein the migration program is executable by the network file server for placing the file data in a migration node in the network file server, and once all of the file data are placed in the migration node, to overwrite an offline node for the file with the migration node, and then to change the offline node for the file to an online node for the file.

63. The program storage device as claimed in claim 58, wherein the migration program is executable by the network file server for migrating a file directory by checking a link count attribute for the file, and upon finding that the link count attribute has a value greater than one, accessing a migration directory to find a node for the file, and placing a reference to the node for the file in the file directory.

64. The program storage device as claimed in claim 58, wherein the migration program is executable by the network file server for walking through the hierarchy of directories to find nodes representing files, and upon finding a node representing a file, for performing a read operation including a read of the last byte of the file.

65. The program storage device as claimed in claim 58, wherein the migration program is executable by the network file server for maintaining a count of the number of offline nodes for the file system, decrementing the count when an offline node is changed to an online node, and recognizing that migration of the file system is finished when the count becomes zero.

* * * * *

UNITED STATES PATENT AND TRADEMARK OFFICE
CERTIFICATE OF CORRECTION

PATENT NO. : 6,938,039 B1
DATED : August 30, 2005
INVENTOR(S) : Paul M. Bober et al.

It is certified that error appears in the above-identified patent and that said Letters Patent is hereby corrected as shown below:

Title page,
Item [54], Title, "ACROSS" is changed to -- ACCESS --.

Column 20,
Line 31, "f6r" is changed to -- for --.

Signed and Sealed this

Seventh Day of February, 2006

JON W. DUDAS
*Director of the United States Patent and Trademark Office*